(12) United States Patent
Ibaraki

(10) Patent No.: US 7,464,739 B2
(45) Date of Patent: Dec. 16, 2008

(54) PNEUMATIC TIRE

(75) Inventor: Daisuke Ibaraki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 67 days.

(21) Appl. No.: 11/371,245

(22) Filed: Mar. 8, 2006

(65) Prior Publication Data

US 2006/0278319 A1    Dec. 14, 2006

(30) Foreign Application Priority Data

Jun. 10, 2005  (JP) ............................... 2005-171627

(51) Int. Cl.
*B60C 13/00* (2006.01)
*B60C 13/02* (2006.01)

(52) U.S. Cl. .................... 152/523; D12/500; D12/502; D12/506; D12/569; D12/571; D12/604; D12/605

(58) Field of Classification Search ................ 152/523; D12/500, 502, 506, 569, 571, 604, 605
See application file for complete search history.

(56) References Cited

U.S. PATENT DOCUMENTS

| | | | |
|---|---|---|---|
| D54,345 S | * 12/1919 | Zeger | D12/571 |
| D247,431 S | * 3/1978 | Mills | D12/569 |
| 4,442,618 A | * 4/1984 | Minter et al. | 40/587 |

FOREIGN PATENT DOCUMENTS

| | | | |
|---|---|---|---|
| EP | 253557 | * | 7/1987 |
| JP | 63-106109 A | | 5/1988 |
| JP | 8-197917 | * | 8/1996 |
| JP | 11-291718 | * | 10/1999 |
| JP | 2001-239810 | * | 9/2001 |

* cited by examiner

*Primary Examiner*—Justin Fischer
(74) *Attorney, Agent, or Firm*—The Webb Law Firm, P.C.

(57) ABSTRACT

The pneumatic tire 1 is provided with a land part 4 in a sidewall region S of a tire and a plurality of marks 11 protruding from a side wall surface, wherein at least one of the marks 11 partially overlaps with the land part 4 and an area of a portion 12 where a mark is overlapped is not greater than 40% with respect to the total area of a mark. In addition, the number of the marks 11 partially overlapping with the land part 4 is not greater than 60 % with respect to the total number of marks. Further, protruded height of the mark 11 from the side wall surface 21 is not greater than 3 mm.

2 Claims, 4 Drawing Sheets

PNEUMATIC TIRE

The description of this application claims benefit of priority based on Japanese Patent Application No.2005-171627, the entire same contents of which are incorporated by reference herein.

BACKGROUND OF THE INVENTION

1. Field of the Invention

The present invention relates to a pneumatic tire provided with a land part (blocks, ribs, and the like) in a side wall region as well and in more detail, the present invention relates to improvement in visibility of marks displayed in a side wall region, prevention of poor tire manufacture, and improvement in tire durability.

2. Description of the Prior Art

In a pneumatic tire, marks such as letters showing manufacturer's names, brand names, tire sizes, and the like, and graphics showing tire rotating directions are sometimes displayed in a side wall region. From the view point of durability, display by coloring and coating has many drawbacks. Therefore, usually, marks are displayed letting them protruded from a side wall surface. Further, like a pneumatic tire disclosed in patent Japanese Patent Laid-Open Publication No. 63-106109, visibility of marks is improved by outlining edge parts of the marks with projection bars called ridges.

By the way, rubber thickness of a tire side wall is relatively thin compared with tread thickness or bead thickness. In order to improve durability of a sidewall or steering stability, means to enhance rubber hardness or means to increase rubber thickness of a side wall have been employed. However, the employment of such means causes the increase in tire weight, and therefore, such means have not been effective.

For this reason, to improve durability or steering stability, for example, a land part is extended from a tread region to a side wall region thereby reinforcing the side wall. In this case, consideration has been made to avoid overlap of a land part and marks. To be specific, position of the marks has been changed, marks themselves have been changed, or size thereof has been reduced. However, since marks are important elements of tire designs, reduction in size of the marks themselves has had a drawback of degradation in merchandize.

Conversely, putting more importance on visibility, visibility of the marks can also be enhanced, allowing the overlap of the land part and the marks and making protruded height of the marks greater than height of the land part. However, this has a drawback of degradation in tire durability or in performance such as increased tire weight, cracking at a base part of the marks, and the like. In addition, when protruded height of the marks increases, poor manufacture at a time of the vulcanizing and molding is likely to occur such as difficulty in molding of the marks (due to rubber shortage). Therefore, with the requirement of adding vent holes or with the requirement of consideration of the cross-sectional shape of the marks, cost of molds has increased.

The object of the present invention is to achieve visibility of marks, prevention of poor manufacture, and improvement in durability of a tire in a pneumatic tire provided with a land part which reinforces a side wall.

SUMMARY OF THE INVENTION

The inventor has found that when the overlapped portion of a land part and marks is not greater than the predetermined ratio, visibility of marks is not degraded, thereby completing the invention. In other words, the present invention has characteristics in that it relates to a pneumatic tire provided with a land part and a plurality of marks protruding from a side wall surface in a side wall region of a tire, wherein at least one of said marks partially overlaps with said land part and an area of a portion where a mark is overlapped is not greater than 40% with respect to the total area of a mark.

As already mentioned, in the tire of the present invention, for reinforcing a side wall, a land part is provided in a side wall region, and said land part and marks partially overlap. However, in a mark which overlaps the land part, when the overlapped portion of the land part and the mark is not greater than 40%, visibility of the mark is hardly affected by the overlapped portion. Therefore, size of the marks need not be reduced, position of the marks need not be changed, or marks themselves need not be changed, and therefore, degradation in merchandizes a tire does not occur due to the marks. In addition, protrusion of the marks need not be set to be higher than the land part and visibility of the marks can be secured. As a result, increase in tire weight can be suppressed and cracking at the base part of the marks can be prevented as well.

Further, in a mold for vulcanizing and molding a tire of the present invention, a concave portion molding the land part and a concave portion molding the mark are connected. As a result, since evacuation of air entrapped in a mold at the time of vulcanizing and molding improves, poor manufacture can be prevented.

The present invention has characteristics in that the number of marks partially overlapping with said land part is not greater than 60% with respect to the total number of marks.

Generally, a plurality of marks are displayed in the tire circumferential direction in a side wall region. Therefore, by setting the number of marks overlapping with the land part not greater than 60%, visibility of marks can further be secured.

The present invention has characteristics in that protruded height of said mark from a side wall surface is not greater than 3 mm.

By setting protruded height of the mark not greater than 3 mm, increase in tire weight can further be inhibited and cracking at the base part of the marks can effectively be prevented.

DESCRIPTION OF THE PREFERRED EMBODIMENTS

An embodiment of a pneumatic tire according to the present invention will now be explained on the basis of the drawings.

Figure 1:
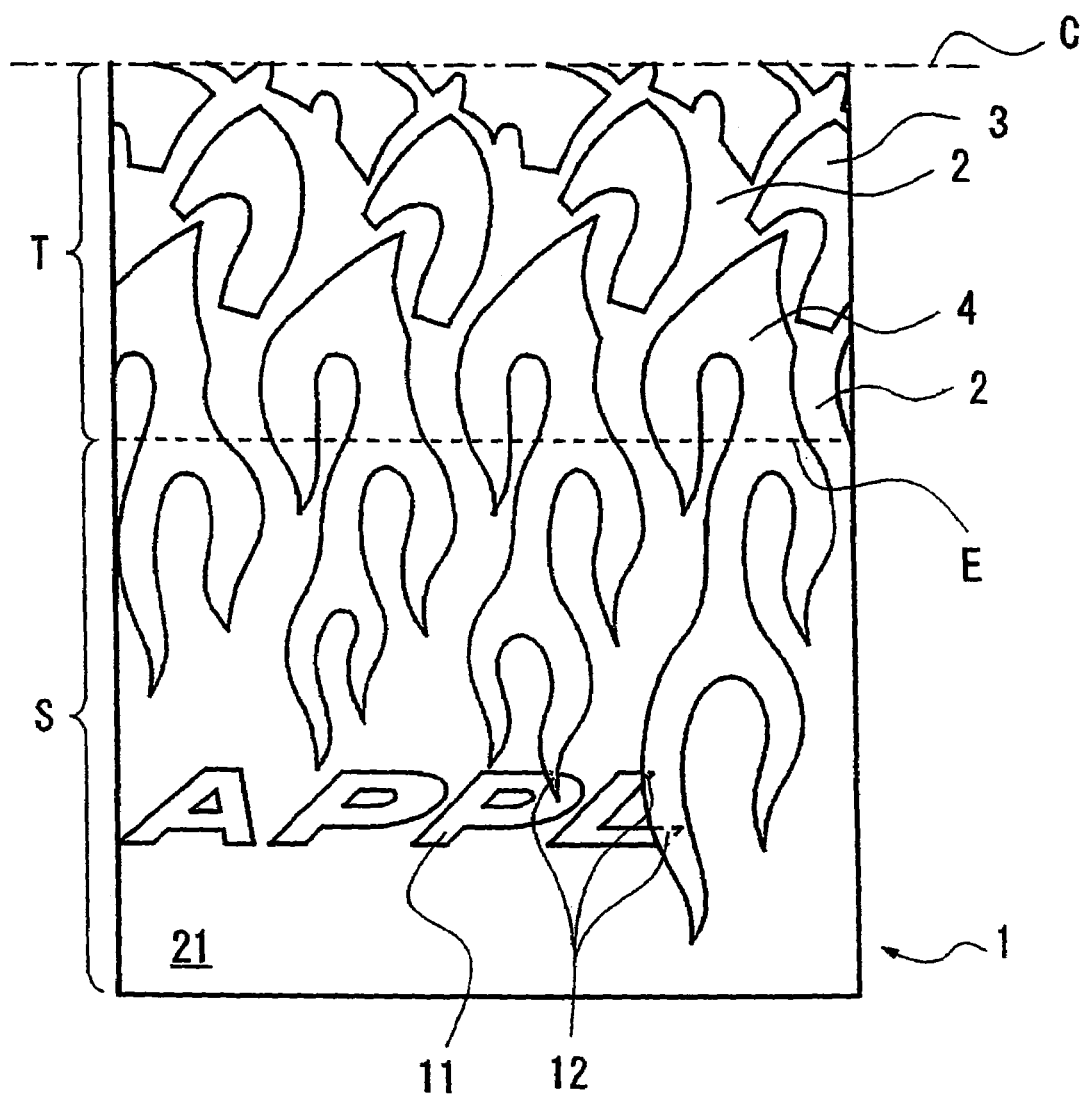
FIG. 1 is a part-development view showing a tread and a side wall of a pneumatic tire related to the present invention.

FIG. 1 is a part-development view showing a tread and a side wall of a pneumatic tire related to the present invention. In tread region T, many grooves 2 are formed, and blocks 3 and 4 are formed. A block 4 present in a shoulder region of a tread extends to a side wall region S over a tire grounding end. The reason that the block 4 is extended to the side wall region S is for reinforcing a side wall. By this, durability of a tire and steering stability are improved. As it approaches the bead part (which is the lower part of the drawing), the height of the block 4 is gradually decreased.

In a side wall region S, a plurality of marks 11 arranged in the tire circumferential direction are formed. Here, as a part of a mark 11, four letters "APPL" are displayed. In the mark 11, the mark P and the mark L overlap with a block 4 and an overlapped portion 12 is formed. For information, the number of the marks 11 partially overlapping with the block 4 is preferably not greater than 60% with respect to the total number of the marks 11.

Figure 2A:
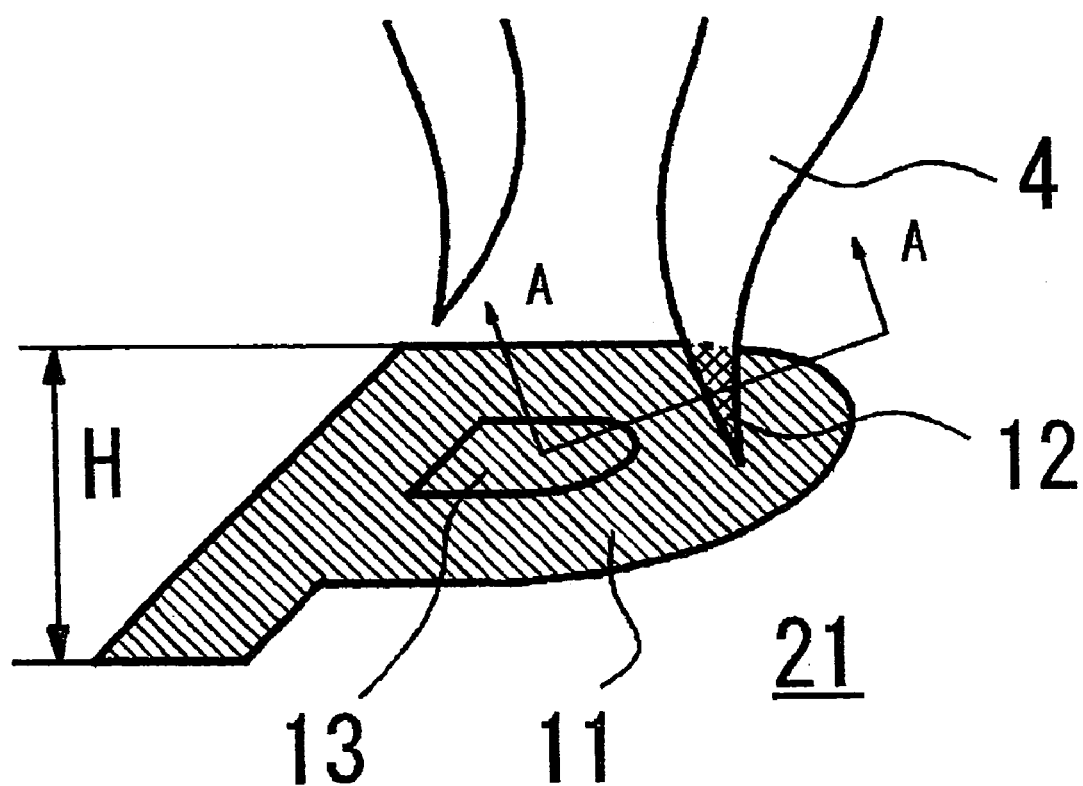
FIGS. 2a and b are part-enlarged views showing a mark and a block.
Figure 2B:
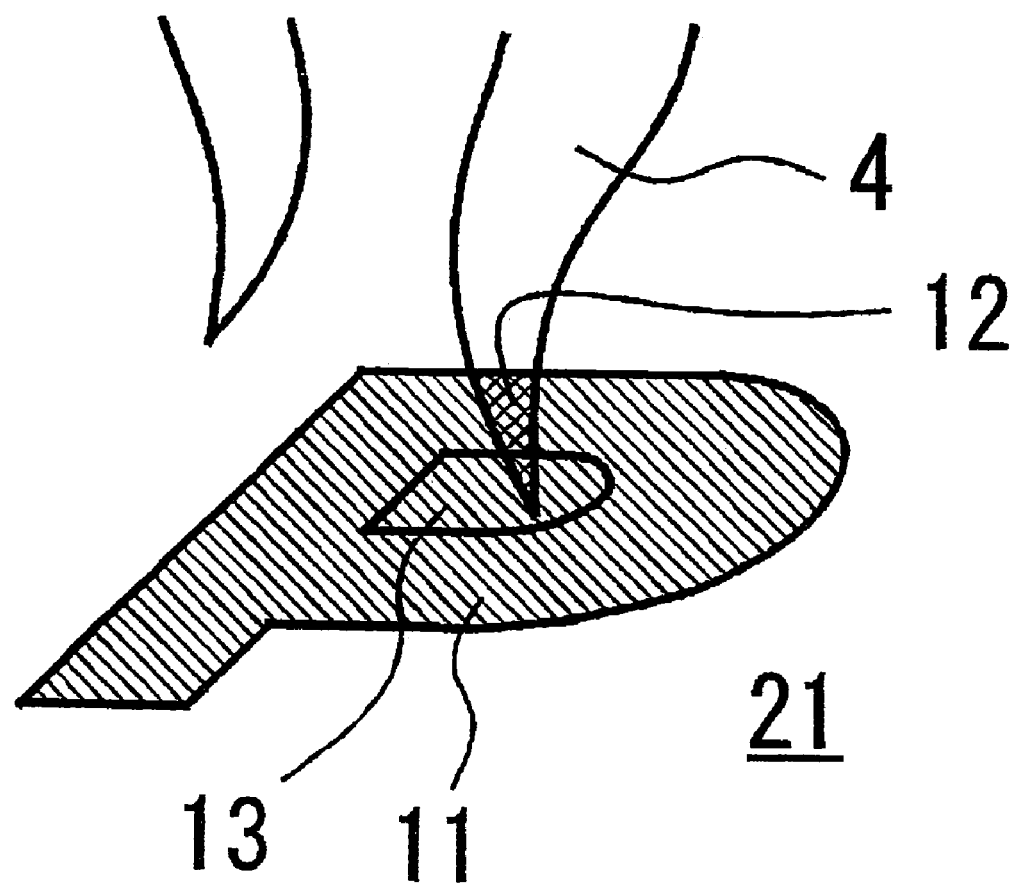
FIG. 2c is a cross-sectional view taken along the line A-A.

FIG. 2*a* is a part-enlarged view showing the overlap of the mark 11 and the block 4. The mark P partially overlaps with the block 4. A mesh portion shown in FIG. 2*a* is an overlapped portion 12 and its area is not greater than 40% of the area of the mark P. The same applies to the mark L in FIG. 1. Here, the area of the mark P is the area of a hatch portion shown in FIG. 2*a* and includes a hollow portion 13. Therefore, as shown in FIG. 2*b*, when the block 4 overlaps with the hollow portion 13, the mesh portion is the overlapped portion 12.

Therefore, even when there is an overlapping portion of the block 4 and the mark 11, the area of the overlapping portion 12 is not greater than 40% of the area of the mark 11. Thus, visibility of the mark 11 is not degraded. Further, since the overlap of the block 4 and the mark 11 is allowed, height of the mark H need not be decreased, the position of the mark need not be changed, or the mark need not be changed. As a result, the mark 11 shows the designing function thereby improving merchandise as a tire.

Figure 2C:
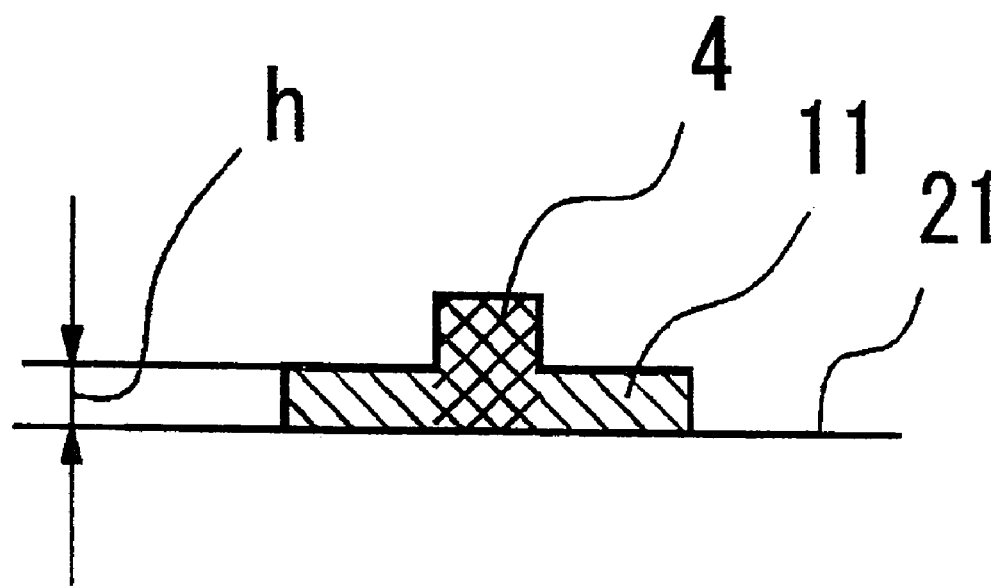

FIG. 2*c* is a cross-sectional view taken along the line A-A. The protruded height h of the mark 11 is lower than the height of the block 4. That is, since the area of the overlapping portion 12 is set to be 40% of the mark 11, the mark 11 need not be protruded higher than the block 4. As a result, no drawbacks of degradation in tire durability or performance occur such as increased tire weight or cracking at the base part of the mark 11. Poor manufacture at the time of vulcanizing and molding such as failure of molding of the mark 11 (due to the rubber shortage) can be prevented.

In addition, by the overlap of the block 4 and the mark 11, in a mold vulcanizing and molding a tire, a concave portion which molds the block 4 (not illustrated) and a concave portion which molds the mark (not illustrated) are connected. As a result, since evacuation of air entrapped in a mold at the time of vulcanizing and molding improves, poor manufacture such as air entrapment can be prevented.

Protruded height h of the mark 11 is preferably not greater than 3 mm. When the height exceeds 3 mm, tire weight increases, which may cause degradation of tire performance. Further, at the time of vulcanizing and molding, air is entrapped and poor manufacture may occur such as partially dropped-out marks and the like.

As a land part, explanation was given taking a block extending from a tread region T to a side wall region S as an example, however, a block may extend from a bead side, for example, from a bead protector, to the contrary. In addition, a block may exist independent from a side wall region S. Further, a land part may extend from a tread region T to a side wall region S with a part of a rib branched.

On the surface of the mark 11, so-called solid letters are shown as examples without any concavities and convexities. Other than this method, visibility of the mark 11 can be enhanced by publicly known methods such as forming many fine grooves on the surface of the mark 11, outlining the mark 11, or the like.

EXAMPLE

As an example and conventional examples, a tire with 17 marks provided on a side wall region was manufactured and its performance was evaluated. The detail of the example and the conventional examples is a tire as shown below.

Tire size: LT285/70R17 all

Example: 10 marks which account for 60% of total number of the marks partially overlap with blocks. The overlapped area of the marks and the block accounts for 5% to 35% of the area of the mark. The height of the mark H is 25 mm and protruded height h is 2.5 mm.

Conventional Example 1 The mark and the block do not overlap. The height of the mark H is 25 mm and protruded height h is 5 mm.

Conventional Example 2 The mark and the block do not overlap. The height of the mark H is 18 mm and protruded height h is 2.5 mm.

The result of the evaluation is shown in Table 1. Visibility in the table is a value showing the visibility of the mark by sensory evaluation. Processability in the table is a value showing poor manufacture ratio at the time of vulcanizing and molding. Durability in the table is a value by a drum durability testing based on the Federal Motor Vehicle Safety Standard (FMVSS) 109 showing the vehicle driven distance until the failure is caused with a rim (17×9.5JJ) fitted with air pressure of 450 kPa. All the values are index when the values of conventional example 1 is taken as 100, and the larger value shows the higher evaluation.

TABLE 1

|  | Example | Conventional Example 1 | Conventional Example 2 |
| --- | --- | --- | --- |
| Visibility | 100 | 100 | 80 |
| Processability | 120 | 100 | 120 |
| Durability | 110 | 100 | 110 |

According to Table 1, a pneumatic tire of the present invention could display the mark with the same size as that of Conventional Example 1 and the same visibility was secured. In addition, the protruded height of the mark could be set to be low, and therefore, there was little poor manufacture and the durability of a tire was improved as well.

What is claimed is:

1. A pneumatic tire provided with a land part and a plurality of marks protruding from a side wall surface in a side wall region, wherein said land part extends from a tread region to said side wall region, wherein at least one of said marks partially overlaps with said land part and an area of a portion where said marks overlaps with said land pad is not greater than 40% with respect to the total area of said marks that are overlapped with said land part, and wherein the plurality of marks partially overlapping with said land part is not greater than 60 % with respect to the total number of marks.

2. The pneumatic tire as set forth in claim 1, wherein protruded height of said mark from a side wall surface is not greater than 3 mm.

* * * * *

UNITED STATES PATENT AND TRADEMARK OFFICE
CERTIFICATE OF CORRECTION

| | | |
|---|---|---|
| PATENT NO. | : 7,464,739 B2 | Page 1 of 1 |
| APPLICATION NO. | : 11/371245 | |
| DATED | : December 16, 2008 | |
| INVENTOR(S) | : Ibaraki | |

It is certified that error appears in the above-identified patent and that said Letters Patent is hereby corrected as shown below:

Column 4, Line 54, Claim 1, "said land pad" should read -- said land part --

Signed and Sealed this

Seventh Day of April, 2009

JOHN DOLL
*Acting Director of the United States Patent and Trademark Office*